(12) United States Patent
Easttom, II

(10) Patent No.: US 10,467,208 B1
(45) Date of Patent: *Nov. 5, 2019

(54) SYSTEM AND METHOD FOR DOCUMENT TRACKING

(71) Applicant: OPEN INVENTION NETWORK LLC, Durham, NC (US)

(72) Inventor: William Charles Easttom, II, McKinney, TX (US)

(73) Assignee: OPEN INVENTION NETWORK LLC, Durham, NC (US)

(*) Notice: Subject to any disclaimer, the term of this patent is extended or adjusted under 35 U.S.C. 154(b) by 200 days.

This patent is subject to a terminal disclaimer.

(21) Appl. No.: 15/695,598

(22) Filed: Sep. 5, 2017

Related U.S. Application Data

(63) Continuation of application No. 13/461,944, filed on May 2, 2012, now Pat. No. 9,753,957.

(60) Provisional application No. 61/481,856, filed on May 3, 2011.

(51) Int. Cl.
| | |
|---|---|
| G06F 16/00 | (2019.01) |
| G06F 16/21 | (2019.01) |
| G06F 16/958 | (2019.01) |
| H04N 1/32 | (2006.01) |
| G06F 16/93 | (2019.01) |

(52) U.S. Cl.
CPC ......... G06F 16/219 (2019.01); G06F 16/972 (2019.01); *G06F 16/93* (2019.01); *H04N 1/32149* (2013.01)

(58) Field of Classification Search
CPC ... H04N 1/32149; G06F 16/219; G06F 16/93; G06F 16/972
See application file for complete search history.

(56) References Cited

U.S. PATENT DOCUMENTS

| | | | | |
|---|---|---|---|---|
| 5,606,609 A | * | 2/1997 | Houser | H04L 9/3236 382/306 |
| 5,956,481 A | * | 9/1999 | Walsh | G06F 21/566 713/188 |
| 7,707,642 B1 | * | 4/2010 | Herbach | G06F 21/6227 726/27 |
| 8,006,307 B1 | * | 8/2011 | Klebe | H04L 9/00 726/26 |
| 2002/0077985 A1 | * | 6/2002 | Kobata | G06F 21/10 705/51 |
| 2002/0078361 A1 | * | 6/2002 | Giroux | H04L 63/0428 713/183 |
| 2005/0234990 A1 | * | 10/2005 | Brighouse | G06F 17/2211 |
| 2006/0028689 A1 | * | 2/2006 | Perry | H04N 1/32144 358/3.28 |
| 2011/0246869 A1 | * | 10/2011 | Vion-Dury | G06F 17/2211 715/229 |

* cited by examiner

*Primary Examiner* — Merilyn P Nguyen

(57) ABSTRACT

To enable tracking of a document's history, each time an electronic document is opened, an embedding module obtains one or more document history parameters. The document history parameters may include a MAC address or the computer used to open the document, an operating system, a file size of the document, time of opening the document, a user ID, etc. The embedding module encrypts the document history parameters and embeds them into the document, for example using steganography techniques.

20 Claims, 4 Drawing Sheets

SYSTEM AND METHOD FOR DOCUMENT TRACKING

CROSS REFERENCE TO RELATED APPLICATIONS

This application is a continuation of, and claims priority to, U.S. patent application Ser. No. 13/461,944 entitled SYSTEM AND METHOD FOR DOCUMENT TRACKING, filed May 2, 2012, now issued U.S. Pat. No. 9,753,957, issued Sep. 5, 2017, which in turn claims priority to U.S. provisional patent application Ser. No. 61/481,856 entitled DOCUMENT TRACKING filed May 3, 2011, the disclosures of which are incorporated in their entirety herein by reference.

FIELD OF THE INVENTION

This disclosure relates to systems and methods for improving security with regard to electronic documents.

BACKGROUND OF THE INVENTION

The recent scandals involving Wikileaks releasing classified documents have brought to light a significant problem. Often classified documents are leaked by individuals who had legitimate access to them. In fact security experts repeatedly warn organizations that their biggest risk are internal employees.

It is critical that government agencies, corporate entities and the like, be able to track the source of leaks. Current methods, such as described in U.S. Pat. No. 6,314,425, focus on controlling who may access a document. Other inventions, such as the Microsoft Image Embedding or watermarking are concerned with copyright issues. None of these track the document each time it moves from computer to computer, user to user. Once a person has the document there is nothing to track how they distribute, copy, or alter that document.

In an effort to combat copyright infringement, many groups have turned to placing watermarks on documents. Many approaches to watermarking documents have been attempted. However, watermarks are easy to remove from a digital document. Also a watermark won't enable the document's movements to be tracked. It will simply identify the original copyright owner of the document.

What is needed, is an improved system and method for tracking documents.

SUMMARY OF THE INVENTION

In one aspect of the disclosure, there is provided a method for electronic document tracking comprising determining opening of an electronic document on a computer, determining at least one document history parameter to be embedded in the electronic document, and embedding the at least one document history parameter in the electronic document.

In one aspect of the disclosure, there is provided a computer system comprising at least one processor, at least one memory operatively associated with the at least one processor, at least one application able to open an electronic document, and at least one embedding module executable on the at least one processor. The embedding module may be programmed to determine that an electronic document has been opened, determine at least one document history parameter, and store the at least one document history parameter in the electronic document.

In one aspect of the disclosure, there is provided a non-transitory computer readable medium comprising instructions executable by at least one processor, that, when executed, cause the at least one processor to determine that an electronic document has been opened, determine at least one document history parameter, and embed the at least one document history parameter in the electronic document using steganography.

BRIEF DESCRIPTION OF THE DRAWINGS

Reference will now be made, by way of example only, to specific embodiments and to the accompanying drawings in which.

DETAILED DESCRIPTION OF THE INVENTION

Current methods, such as Microsoft U.S. Pat. No. 6,314,425, focus on restricting access to sensitive documents. But this does nothing to help ameliorate situations where authorized people leak or alter a document. The current invention contemplates complete document tracking so that if a sensitive document is leaked, it can be traced back to who leaked it. Each document would have embedded in it a record of its creation, editing, as well as when and where it was opened. Then, if a document is forwarded to an unauthorized source, the leak can be traced back to its origin.

Figure 1:
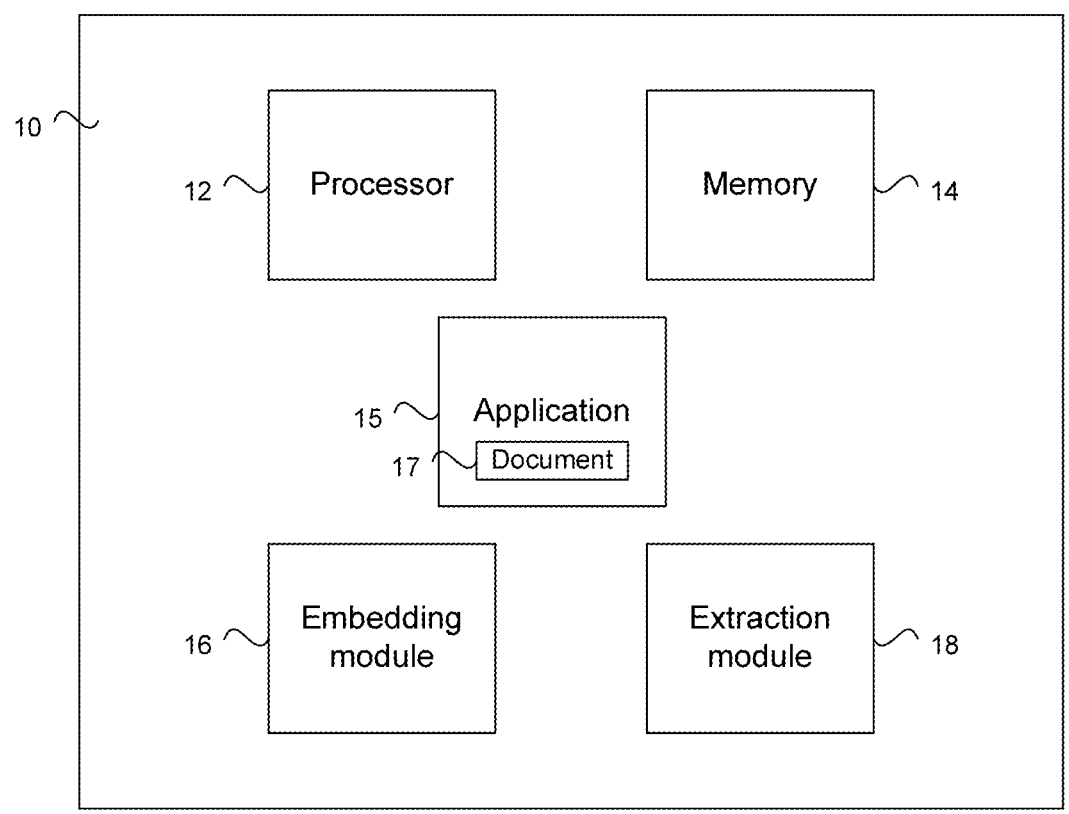
FIG. 1 shows a computer system.

In FIG. 1, there is shown a computer system 10 that can be used for implementing the document tracking methods to be described. The system 10 includes at least one processor 12 and at least one memory operatively associated with the processor 12. An application 15 may be used for creating, editing and/or viewing an electronic document 17. An embedding module 16 is provided for embedding document history parameters with an electronic document and an extraction module 18 is provided for reading and extracting the document history parameters embedded within the document. In various embodiments, a single computer system need not comprise all of the components illustrated in FIG. 1. For example, the extraction module 18 may be provided on a different computer to the embedding module 16 and application 15.

The computer system 10 may be a standalone device, may be part of a local area network, part of a computing cloud and may be connected to various networks, including the internet, by IP and/or wireless protocols. The computer 10 may be a desktop, laptop, mobile phone or other similar computing device that is able to access any of the document types mentioned above. The document 15 may be stored within the memory 14 of the computer 10, within the file system of another computer device accessible through a network, a local database, a cloud computing database, or on any device accessible by the computer 10.

Figure 2:
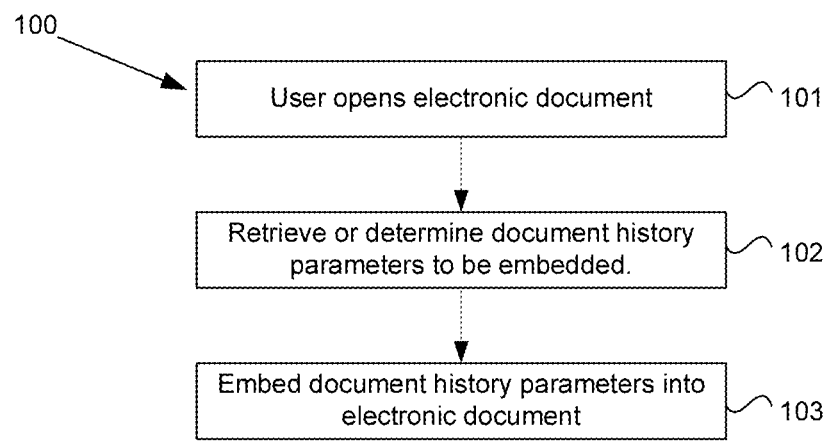
FIG. 2 shows a method for tracking document history.

In FIG. 2, there is shown a method 100 for providing increased security with regard to an electronic document 17 that may be implemented on the system 10 of FIG. 1. At step 101, the system determines that an electronic document 17 has been opened on a computer.

The electronic document 17 may be a text file, image file, video file, sound file, spreadsheet, database file and/or other file type that will be apparent to a person skilled in the art as well as any and all such combinations of these file types.

The document 17 is shown as being opened within an application 15 which may be a word processor e.g. Microsoft Word, TextEdit, etc., a document viewer such as Adobe, Irfanview, Media Player, email program, web browser, etc. Other applications for creating, viewing, and/or editing documents will be apparent to a person skilled in the art.

At step 102, the system then determines one or more document history parameters to be embedded into the document, which the system then embeds into the document at step 103. At the conclusion of the process 100, e.g. when the electronic document is saved or otherwise closed, the document history parameters are embedded in the data of the electronic document and thus have become an integral part of the document.

Various document history parameters may be embedded within the document. Parameters to be embedded may include parameters that pertain directly to the document, such as whether the document was changed, the document file size, the file size upon opening versus the file size upon closing, the date and time that the document was opened, etc. Parameters to be embedded may also include parameters that pertain indirectly to the document, such as the MAC address of the computer that the document was opened on, the identity of a user that opened the document, or that emailed, printed, forwarded and/or the document etc. The data to be stored could include any or all of the following: the MAC (Network Card) address of the machine on which the document is open; the user name of the machine on which the document is open (this can be retrieved from the host operating system); the date and time the document is opened; the size of the file upon opening and upon closing. Other suitable parameters will be apparent to a person skilled in the art. While it is possible to use the IP address, the MAC address is chosen over the IP address, because MAC addresses are unique. Private IP's (as most machines inside a network have) are not unique. It would also be possible to include other identifying information such as hard drive ID, RAM configuration, operating system version etc.

By recording the size of the document when opened, verses the size of the document when closed, a record of changes to the document can be created. This would enable someone to audit every change made to a document, the time the change was made, and on what computer the change was made. Other ways of recording and embedding changes to the document will be apparent to a person skilled in the art. In one simple example, a Boolean true/false value can be recorded upon closing that indicates whether any content of the document has been modified.

As shown in FIG. 1, the computer system 10 may include an embedding module 16. The embedding module 16 is programmed to retrieve the necessary data for the document history each time that the document is opened. The embedding module 16 is able to read the existing document history data within the document and to add new document history parameters to the existing data. The embedding module 16 controls the addressing and placement of the document history parameters so that the complete document history can be extracted from the document when required.

In one embodiment, the embedding module 16 is programmed to apply a steganography process to embed the document history parameters in the electronic document. Steganography refers to any methodology used to hide a message (including text, sound, or picture) in a separate file. One method is to use the least significant bits of an image to store data. For example in a high resolution graphics file, each pixel is represented by 24 bits. By using the least significant (i.e. the last 1 or 2 bits) to store other data, the image is not compromised and data is hidden in the image.

Steganography is a process used to store messages in the least significant bits of a text, image, video, or sound file. Essentially document data would be stored, in an encrypted format, in the document itself, via steganography techniques. Most commonly text or an image is inserted into another image. However there are permutations where video is hidden in another video, or sound in sound or even sound in video. Other permutations will be apparent to a person skilled in the art, including permutations where the document history parameters are hidden in a predominantly text file. The image/sound/video that the underlying message is hidden in is referred to as a carrier or cover file or signal.

In one embodiment, one particular type of steganography is utilized in which the data is stored in white space in the document. It is important to remember that even blanks are translated to bits, and thus can be used to hide data.

The embedding module 16 may be programmed to encrypt the document history parameters prior to embedding the parameters in the document. The encryption algorithm used to secure the data within the document could vary from implementation to implementation. Any standard encryption algorithm such as the symmetric algorithms 3DES, BlowFish, AES, or even asymmetric algorithms such as RSA would be appropriate.

While encrypting this data is highly recommended, it is optional. In one embodiment the relevant data is stored, via steganography, in plain text. The problem with this approach is that not encrypting this tracking data would allow the possibility that someone could alter that data.

Figure 3:
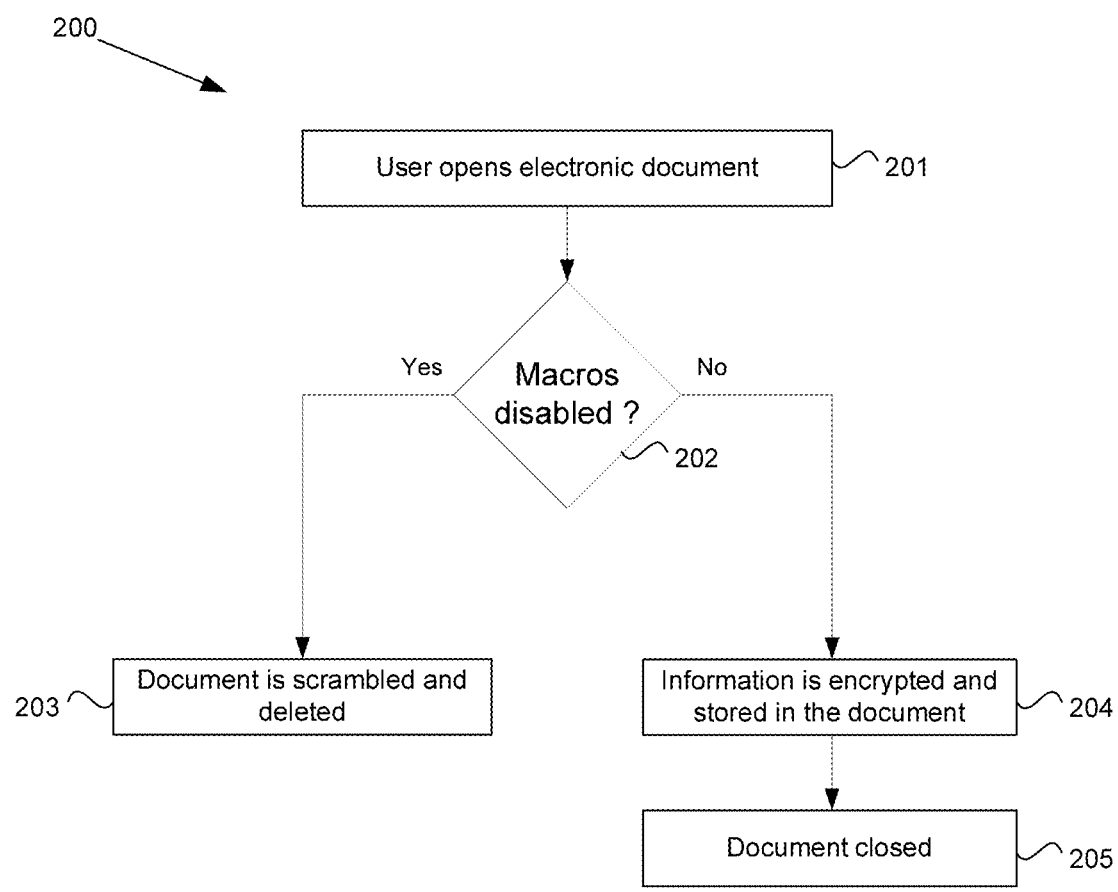
FIG. 3 shows a method for preventing circumvention of the document tracking.

In one embodiment, the embedding module 16 may be provided as an executable module that is embedded in the document and that retrieves the required information, encrypts that data and stores it in the document itself. That module could be in the form of a macro. In order to prevent the document history tracking being circumvented, a startup routine could be included such that if the end user attempted to disable macros, the document would be overwritten with junk data and deleted. With reference to the flowchart 200 of FIG. 3, at step 201, the document 17 is opened. If the macro routine detects that macros have been disabled (decision step 202), then the macro scrambles the document data and deletes the file 203. Otherwise, the macro continues as programmed to retrieve, encrypt and embed the relevant document history parameters into the document (step 204) prior to the document being closed 205.

In an alternative embodiment, the word processor itself is modified to include the embedding module 16 that is programmed to automatically store the required document history parameters in any document.

Figure 4:
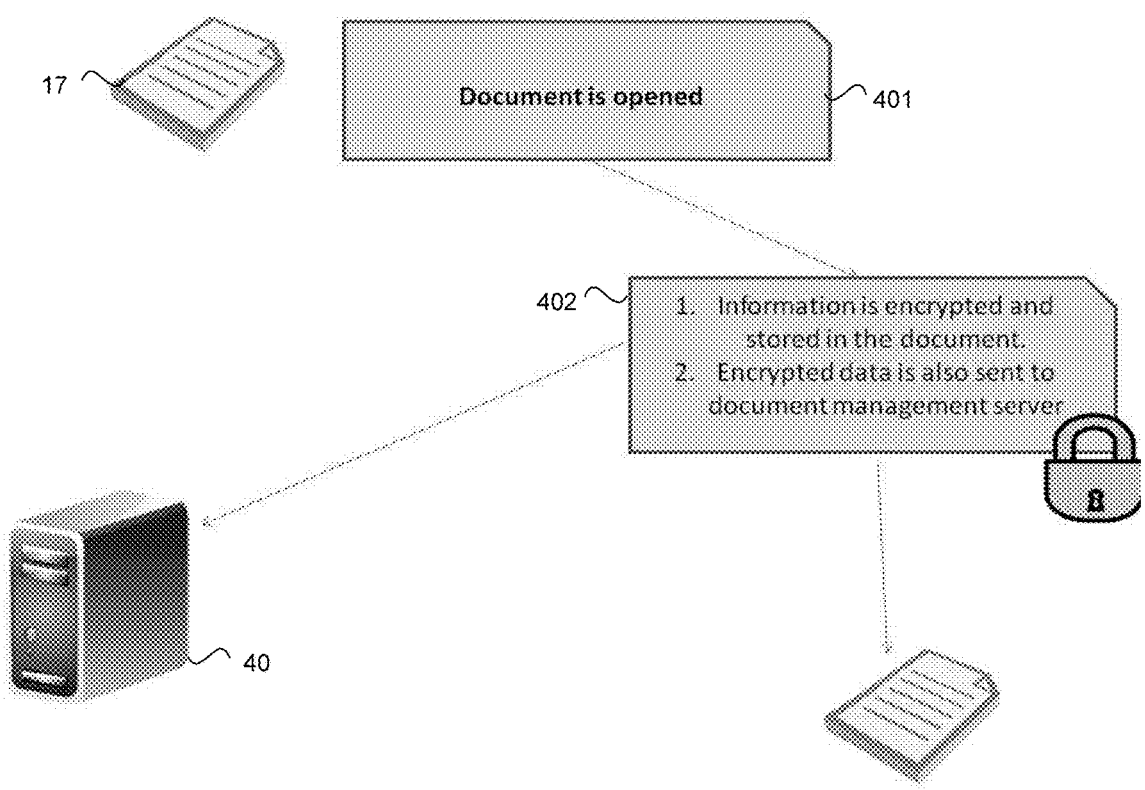
FIG. 4 shows a method for providing document history parameters to a document management server.

FIG. 4 depicts an embodiment in which, in addition to storing the document history parameters within the document 17, the document history parameters are also sent to a document management server 40. At step 401, the document 17 is opened. At step 402, the information is encrypted and stored in the document 17 by the embedding module 16 which also communicates the encrypted data to the server 40. The use of the server 40 allows centralized tracking of the documents movements and alterations. The server that tracks document changes and location could be available via VPN over the internet or it could be a server on a local network only accessible within that network.

While it has been known to track and highlight changes to documents, and to record various metadata associated with a document such as file size, document creator, date of last modification etc, a difference with the present embodiments is that the document history parameters described in the present embodiments become embedded in the document itself and in a manner that is not typically visible to the user using the standard document viewing/editing application, and is not typically changeable by the user. The embedding of the document history parameters is automatic so that the user is unable to delete, change or otherwise edit the document history parameters and the document history parameters become a fixed and permanent part of the document. Furthermore, the document history parameters travel with the document so that actions such as renaming the document, moving the document between file systems, etc. will not alter the document history. A further distinction compared to prior art systems is that each time the document is opened, a new set of document history parameters is obtained and added to the existing document history embedded within the document, without overwriting any of the previous document history.

As shown in FIG. 1, the computer system 10 includes an extraction module 18. The extraction module is used when the document history is required to be extracted from an electronic document. The extraction module 18 is programmed to process the document to extract the document history parameters hidden within the document, decrypt the data and provide an output readable by a user. Access to the extraction module may be limited for security reasons to particular persons. Alternatively or in addition, the document history parameters hidden within the document may be password or otherwise protected so that only certain persons have access to read the document history.

The components of the system 10 may be embodied in hardware, software, firmware or a combination of hardware, software and/or firmware. In particular, the embedding module 16 may be stored as a set of executable instructions in a non-transitory computer readable medium that is operatively associated with the computer system 10.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for electronic document tracking comprising:
   determining at least two document history parameters to be encrypted and embedded in an electronic document, wherein at least one of the two document history parameters is associated with a unique identifier for a computer and at least another of the two document history parameters is associated with an identity of a user of the computer;
   embedding, using visual and digital steganography within apparent blanks in the document, the at least two document history parameters in the electronic document, wherein the document history parameters are a fixed and permanent part of the document and may not be at least one of deleted, changed and edited;
   determining whether the electronic document tracking has been disabled;
   overwriting and scrambling the electronic document upon determination that the electronic document tracking has been disabled; and
   deleting the scrambled electronic document upon determination that the electronic document tracking has been disabled.

2. The method of claim 1 wherein at least one of the at least two document history parameters comprises a Media Access Control (MAC) address of the computer that is used to open the electronic document.

3. The method of claim 1 wherein at least one of the at least two document history parameters comprises a user identity of a user of the computer that is used to open the electronic document.

4. The method of claim 1 wherein at least one of the at least two document history parameters comprises a time at which the electronic document was opened.

5. The method of claim 1 wherein at least one of the at least two document history parameters comprises a file size of the electronic document.

6. The method of claim 1 comprising encrypting at least one of the at least two document history parameters and embedding the encrypted one of the at least two document history parameters in the electronic document.

7. The method of claim 1 wherein the determined at least two document history parameters is added to one or more document history parameters previously embedded in the electronic document.

8. The method of claim 1 wherein embedding at least one of the at least two document history parameters comprises steganography.

9. The method of claim 1 comprising adding at least one document history parameter to the embedded document history parameters of the electronic document each time the electronic document is opened.

10. A computer system comprising at least one processor, at least one memory operatively associated with the at least one processor, and at least one embedding module executable on the at least one processor, the at least one embedding module programmed to:
   determine at least two document history parameters to be encrypted and embedded in an electronic document, wherein at least one of the two document history parameters is associated with a unique identifier for a computer and at least another of the two document history parameters is associated with an identity of a user of the computer;
   store the at least two document history parameters in the electronic document using visual and digital steganography within apparent blanks in the document, wherein the document history parameters are a fixed and permanent part of the document and may not be at least one of deleted, changed and edited;
determine whether the electronic document tracking has been disabled;
overwrite and scramble the electronic document upon determination that the electronic document tracking has been disabled; and
delete the scrambled electronic document upon determination that the electronic document tracking has been disabled.

11. The computer system of claim 10 comprising an extraction module configured to process the electronic document to extract one or more of the document history parameters that are embedded in the electronic document.

12. The computer system of claim 10 wherein the embedding module is a macro executable within the electronic document.

13. The computer system of claim 10 wherein the embedding module is configured to communicate at least one of the at least two document history parameters from the computer system to a server.

14. The computer system of claim 10 wherein at least one of the at least two document history parameters comprises a Media Access Control (MAC) address of the computer that is used to open the electronic document.

15. The computer system of claim 10 wherein at least one of the at least two document history parameters comprises a user identity of a user of the computer that is used to open the electronic document.

16. The computer system of claim 10 wherein at least one of the at least two document history parameters comprises a time at which the electronic document was opened.

17. The computer system of claim 10 wherein at least one of the at least two document history parameters comprises a file size of the electronic document.

18. The computer system of claim 10 wherein the embedding module is programmed to encrypt at least one of the at least two document history parameters and store the encrypted at least one document history parameter in the electronic document.

19. The computer system of claim 10 wherein the embedding module is programmed to store the at least one document history parameter in the electronic document using steganography.

20. A non-transitory computer readable medium comprising instructions executable by at least one processor, that, when executed, cause the at least one processor to:
determine at least two document history parameters to be encrypted and embedded in an electronic document, wherein at least one of the two document history parameters is associated with a unique identifier for a computer and at least another of the two document history parameters is associated with an identity of a user of the computer;
embed the at least two document history parameters in the electronic document using visual and digital steganography within apparent blanks in the document, wherein the document history parameters are a fixed and permanent part of the document and may not be at least one of deleted, changed and edited;
determining whether the electronic document tracking has been disabled;
overwriting and scrambling the electronic document upon determination that the electronic document tracking has been disabled; and
deleting the scrambled electronic document upon determination that the electronic document tracking has been disabled.

\* \* \* \* \*